(12) United States Patent
Lee et al.

(10) Patent No.: US 11,370,327 B2
(45) Date of Patent: Jun. 28, 2022

(54) HOLLOW-TYPE BLDC MOTOR OF POWER SLIDING DEVICE OF VEHICLE SEAT

(71) Applicant: DAS Co., Ltd., Gyeongsangbuk-do (KR)

(72) Inventors: Kwang Sin Lee, Gyeonggi-do (KR); In Ho Jo, Gyeonggi-do (KR)

(73) Assignee: DAS CO., LTD., Gyeongsangbuk-Do (KR)

( * ) Notice: Subject to any disclaimer, the term of this patent is extended or adjusted under 35 U.S.C. 154(b) by 0 days.

(21) Appl. No.: 17/084,317

(22) Filed: Oct. 29, 2020

(65) Prior Publication Data

US 2021/0129709 A1 May 6, 2021

(30) Foreign Application Priority Data

Oct. 30, 2019 (KR) .......................... 10-2019-136858

(51) Int. Cl.
| | | |
|---|---|---|
| B60N 2/02 | (2006.01) | |
| B60N 2/06 | (2006.01) | |
| F16H 25/20 | (2006.01) | |
| F16H 25/24 | (2006.01) | |
| H02K 1/12 | (2006.01) | |
| H02K 1/22 | (2006.01) | |
| H02K 5/04 | (2006.01) | |

(52) U.S. Cl.
CPC .......... *B60N 2/0232* (2013.01); *B60N 2/067* (2013.01); *F16H 25/20* (2013.01); *F16H 25/24* (2013.01); *H02K 1/12* (2013.01); *H02K 1/22* (2013.01); *H02K 5/04* (2013.01); *B60N 2002/0236* (2013.01); *F16H 2025/2078* (2013.01)

(58) Field of Classification Search
CPC .................. B60N 2/0232; B60N 2/067; B60N 2002/0236; F16H 25/20; F16H 25/24; F16H 2025/2078; H02K 1/12; H02K 1/22; H02K 5/04
USPC ....................................................... 297/344.1
See application file for complete search history.

(56) References Cited

FOREIGN PATENT DOCUMENTS

| JP | 2015-063212 | * | 4/2015 |
| JP | 2015063212 | * | 4/2015 |
| KR | 101991256 B1 | | 6/2019 |

\* cited by examiner

*Primary Examiner* — Mark R Wendell
(74) *Attorney, Agent, or Firm* — Tarolli, Sundheim, Covell & Tummino LLP

(57) ABSTRACT

The present disclosure relates to a hollow-type BLDC motor of a power sliding device of a vehicle seat, and a nut coupled to a lead screw is injection-molded with a plastic and installed only on a longitudinal partial section of the inner diameter of a rotor, a magnet of the rotor is produced in an integrated cylindrical shape having no gap between magnetic poles, and a skew angle is given on a boundary line between the magnetic poles, thereby reducing noise and vibration.

10 Claims, 4 Drawing Sheets

HOLLOW-TYPE BLDC MOTOR OF POWER SLIDING DEVICE OF VEHICLE SEAT

CROSS-REFERENCE TO RELATED APPLICATION

This application claims priority to Korean Patent Application No. 10-2019-0136858, filed on Oct. 30, 2019, the disclosure of which is incorporated herein by reference in its entirety.

BACKGROUND OF THE DISCLOSURE

Field of the Disclosure

The present disclosure relates to a hollow-type BLDC motor of a power sliding device of a vehicle seat, and more specifically, to a hollow-type BLDC motor of a power sliding device of a vehicle seat which may reduce noise and vibration during operation.

Description of the Related Art

A power sliding device of a vehicle seat is a device for allowing a passenger to adjust a location of a seat back and forth according to his/her body condition or as necessary.

A back-and-forth movement of the seat basically uses a slide rail, and a lower rail of the slide rail is fixed to a floor of a vehicle interior, and a cushion frame of the seat is fixed to an upper rail, such that the seat may be moved in a back-and-forth direction together with the upper rail moving along the lower rail.

The power sliding device operates the upper rail by a motor, and in recent years, a type in which the motor is installed inside the rail has been developed to simplify a configuration of the power sliding device, and avoid the interference with the surroundings while the seat is operated.

The motor is a hollow-type motor and formed in a structure in which a lead screw fixed to the lower rail is engaged with a nut of a rotor, and a motor case is fixed to the upper rail, and when the motor is operated, the motor is moved along the lead screw, and thus the upper rail to which the motor is fixed is moved back and forth, such that the back-and-forth location of the seat may be adjusted. Further, the noise and vibration during operation are reduced using a BLDC motor as the hollow-type motor.

However, in recent years, small noise and vibration generated in the interior are largely felt compared to the related art as the interior quietness and traveling vibration reduction performance of a vehicle are further improved. Particularly, since a seat is in close contact with the body of a passenger and the contact area thereof is large, the noise and vibration generated in the seat are felt more sensitively, and thus it is necessary to further reduce the noise and vibration generated when a power sliding device of the seat is operated.

RELATED ART DOCUMENT

Patent Document (Patent Document 1) Korean Patent No. 10-1991256 (Jun. 21, 2019)

SUMMARY OF THE DISCLOSURE

Therefore, the present disclosure is intended according to the above needs, and an object of the present disclosure is to provide a hollow-type BLDC motor of a power sliding device of a vehicle seat which may further reduce the noise and vibration generated when a power sliding device is operated.

The present disclosure for achieving the object includes: a case composed of a core case, a motor case installed on both ends of the core case, and a motor cover, a stator core installed inside the core case, a coil wound around the stator core, a rotor sleeve located on the center inside the case, a nut fixed to the inside of the rotor sleeve, a first shaft and a second shaft fixed to both ends of the rotor sleeve, respectively, and one magnet mounted in a structure surrounding the outer circumferential surface of the rotor sleeve.

Further, the nut may be injection-molded with a plastic material.

Further, one nut may be installed on the longitudinal intermediate portion of the rotor sleeve.

In this case, it is preferable that a small diameter portion is formed on the center of the inner diameter portion of the rotor sleeve, a large diameter portion is formed on both sides of the small diameter portion, the nut is inserted into and installed on the small diameter portion, the first shaft and the second shaft are inserted into the large diameter portion and locked to a locking projection between the small diameter portion and the large diameter portion, the nut is formed at the same length as the small diameter portion, and the inner diameter of the small diameter portion has the medium size between the outer diameters and inner diameters of the first shaft and the second shaft.

Further, the nut may be installed on each of both ends of the rotor sleeve.

In this case, it is preferable that a small diameter portion is formed on the center of the inner diameter portion of the rotor sleeve, a large diameter portion is formed on both sides of the small diameter portion, the first shaft and the second shaft are inserted into the larger diameter portion of both sides and locked to a locking projection between the small diameter portion and the large diameter portion, insertion grooves are formed in the ends of the first shaft and the second shaft inserted into the large diameter portion, a first nut and a second nut are inserted into the insertion grooves, both side ends of the first nut and the second nut are in close contact and supported between the locking projection of the rotor sleeve and locking projections inside the insertion grooves of the first shaft and the second shaft, and the inner diameter of the small diameter portion has the medium size between the outer diameters and inner diameters of the first nut and the second nut.

Further, the magnet is magnetized by repeating an N pole and an S pole in the same range in a circumferential direction on the object to be magnetized having a cylindrical shape.

Further, a gap does not exist between the magnetic poles of the magnet.

Further, the magnet has a skew angle formed on a boundary line between the magnetic poles, and the skew angle is in a range of 5° or more to 15° or less.

Further, bearings for supporting the first shaft and the second shaft are inserted into and seated on the inner portions of the motor case and the motor cover.

The present disclosure described above has the nut provided in the motor and made of the plastic molded product, which is a material different from that of the lead screw, thereby reducing the noise and vibration caused by the friction with the lead screw.

The nut is installed on only a part (the intermediate portion or both end portions) of the rotor to reduce the area of the screw coupling portion, thereby reducing noise and vibration.

The gap between the magnets attached to the rotor is removed to reduce the cogging torque, thereby reducing noise and vibration.

The skew is formed to the magnet of the rotor to reduce the cogging torque, thereby reducing noise and vibration.

DESCRIPTION OF SPECIFIC EMBODIMENTS

Figure 1:
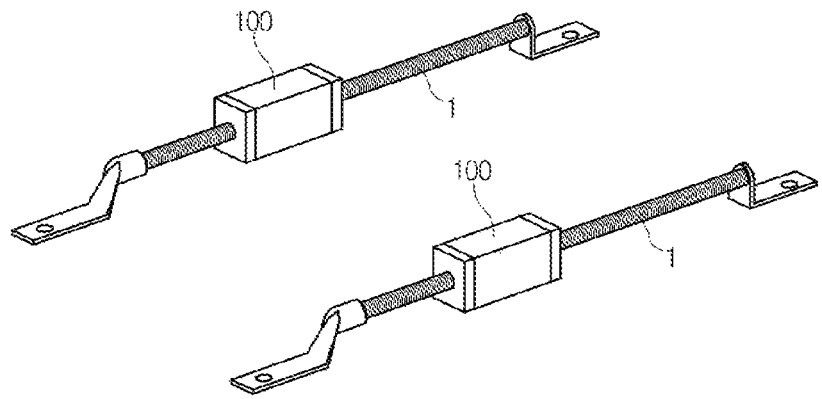
FIG. 1 is a diagram illustrating the assembled state of a hollow-type BLDC motor and a lead screw of a power sliding device of a vehicle seat according to the present disclosure.

Since the present disclosure may be variously changed and may have various exemplary embodiments, specific exemplary embodiments will be illustrated in the drawings and described in detail. However, it should be understood that this is not intended to limit the present disclosure to the specific exemplary embodiment, and includes all changes, equivalents, and substitutions included in the spirit and technical scope of the present disclosure. The thickness, the size of the component, and the like of the lines illustrated in the accompanying drawings may be exaggeratedly illustrated for clarity and convenience of explanation.

Further, the terms to be described later are the terms defined in consideration of the functions according to the present disclosure and these terms may be changed according to the operator or user's intention or custom. Therefore, these terms should be defined based on the contents throughout the present specification.

Hereinafter, a preferred exemplary embodiment of the present disclosure will be described in detail with reference to the accompanying drawings.

FIG. 1 is a diagram illustrating the assembled state of a hollow-type BLDC motor and a lead screw according to the present disclosure. The hollow-type BLDC motor 100 (hereinafter, referred to as 'the motor 100') according to the present disclosure has the appearance of a rectangular parallelepiped shape, and is formed with a through-hole in a longitudinal direction, such that a lead screw 1 is inserted into the through-hole and screw-coupled to a nut inside the motor.

All of the assemblies of the lead screw 1 and the motor 100 are equally installed inside left and right slide rails of a seat. Both ends of the lead screw 1 are fixed to a lower rail via a bracket having substantially an L shape, and the motor 100 is fixed to an upper rail. Therefore, when the motor 100 is operated, the nut is rotated, such that the motor 100 is moved back and forth in the longitudinal direction of the lead screw 1 by the screw operation of the nut and the lead screw 1, and the upper rail is moved back and forth together with the motor 100, and thus the seat fixed to the upper rail is moved back and forth.

Figure 2:
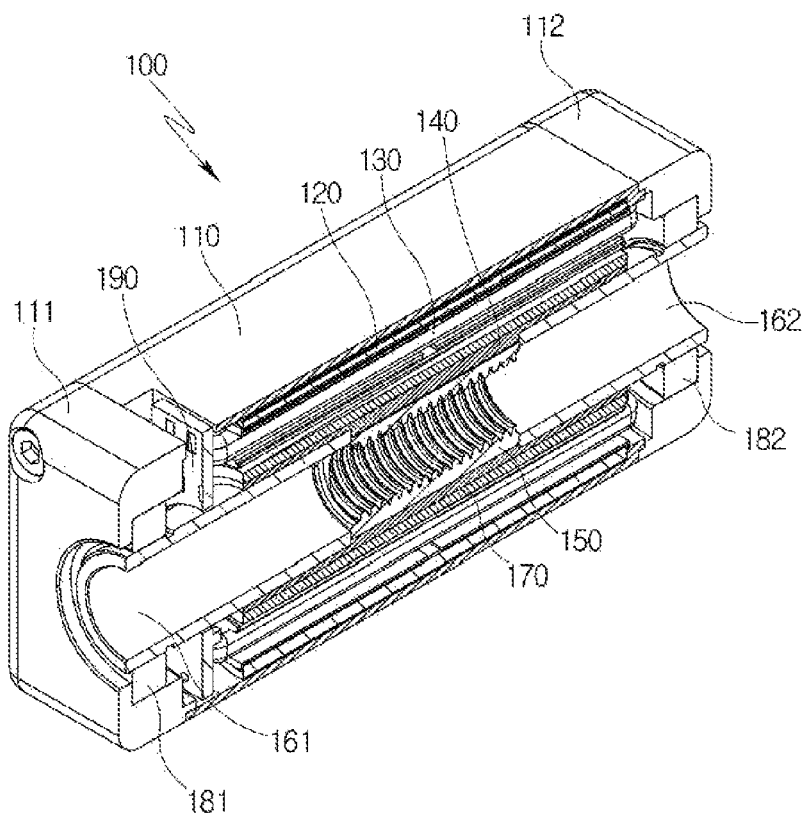
FIG. 2 is a cutout perspective diagram illustrating the motor according to the present disclosure.

FIG. 2 is a cutout perspective diagram illustrating the motor 100 according to the present disclosure. The motor 100 includes a case composed of a core case 110, a motor case 111 mounted on both ends of the core case 110, and a motor cover 112, a stator core 120 inserted into the core case 110, a coil 130 wound around the stator core 120, a rotor sleeve 140 located on the center inside the core case 110, a nut 150 fixed to the inside of the rotor sleeve 140, a first shaft 161 and a second shaft 162 fixed to both ends of the rotor sleeve 140, and a magnet 170 mounted in a structure surrounding the outer circumferential surface of the rotor sleeve 140 and composed of one body.

The stator core 120 is formed with six slots (not illustrated) in a circumferential direction, and the coil 130 is wound inside the slot. A gap exists between the inner circumferential surface of the stator core 120 and the magnet 170 such that the rotor may be rotated without the friction with the stator.

The first shaft 161 and the second shaft 162 have a circular hollow tube shape, and the rotations thereof are freely supported by bearings 181, 182, respectively.

Both ends of the core case 110 are mounted with the motor case 111 and the motor cover 112 which are detachable, respectively. The motor case 111 and the motor cover 112 support the bearings 181, 182, respectively. Further, a circuit board 190 in which a circuit for controlling the rotation of the motor is configured is installed on the motor case 111 side, and the shape in which the circuit board 190 is seated is formed inside the motor case 111.

Further, the motor case 111 and the motor cover 112 serve to axially align the first shaft 161 and the second shaft 162 such that the rotor may be smoothly rotated. To this end, the bearings 181, 182 for supporting the first shaft 161 and the second shaft 162 are inserted into and seated on the insides of the motor case 111 and the motor cover 112 in the accurately aligned state.

The motor 100 inserts and rotates the lead screw 1 into any one side of the first shaft 161 or the second shaft 162, and thus may assemble the lead screw 1 to the nut 150 in the screw-coupled state. In this state, when a bracket is fixed to both ends of the lead screw 1, the assembly of the lead screw 1 and the motor 100 illustrated in FIG. 1 is configured.

The nut 150 is an injection-molded product made of a plastic material. It is natural that the product cooled and cured after the injection molding has the strength and abrasion resistance sufficient for being used as the nut 150. As described above, the nut 150 is made of a plastic material different from a steel material of the lead screw 1, thereby reducing noise and vibration upon mutual friction.

Figure 3:
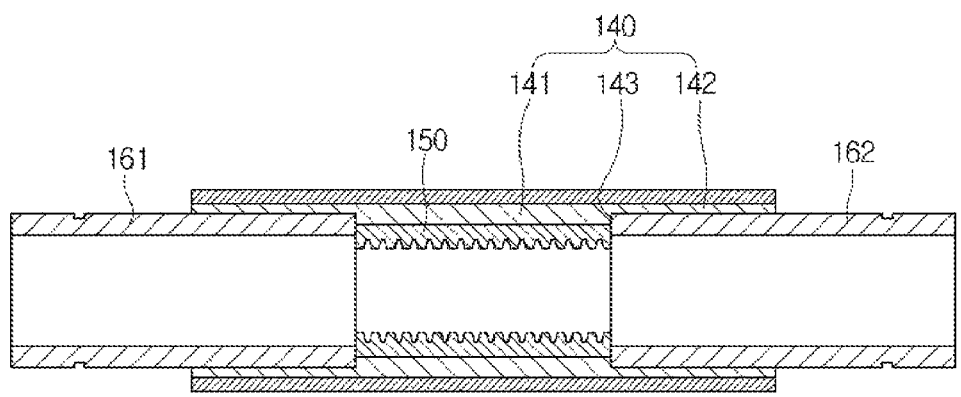
FIG. 3 is a cross-sectional diagram illustrating a rotor which is a component of the motor according to the present disclosure, and a diagram illustrating an exemplary embodiment in which a nut is installed on an intermediate portion thereof.

FIG. 3 specifically illustrates the installation structure of the nut 150.

The nut 150 is installed inside the rotor sleeve 140 in the fixed state. The inner diameter portion of the rotor sleeve 140 is molded by being classified into a small diameter portion 141 of the intermediate portion thereof, and a large diameter portion 142 on both sides of the small diameter portion 141. That is, a portion formed such that the intermediate portion is formed to protrude toward the center axis rather than both sides thereof (i.e., the small diameter portion 141) exists on the inner circumferential surface of the rotor sleeve 140. Therefore, a locking projection 143 is formed between the small diameter portion 141 and the large diameter portion 142.

The nut 150 is inserted into and fixed to the inner circumferential surface of the small diameter portion 141, and the nut 150 is fixed to the rotor sleeve 140 by a press-fitting process, a bonding process using an adhesive, or forming a circumferentially locked protrusion and a groove therebetween such that the rotor sleeve 140 and the nut 150 may be integrally rotated.

The first shaft 161 and the second shaft 162 are inserted into and installed on both ends of the rotor sleeve 140, respectively. The first shaft 161 and the second shaft 162 are inserted into the large diameter portion 142 on both sides of the rotor sleeve 140, and mutually fixed by various methods described above. If the first shaft 161 and the second shaft 162 are made of a metal material the same as that of the rotor sleeve 140, the welding of various methods may also be used. Therefore, the first shaft 161 and the second shaft 162 are also rotated together with the rotor sleeve 140 like the nut 150.

The first shaft 161 and the second shaft 162 may have the ends of the inserted sides which are in contact with the locking projection 143 when being inserted into the large diameter portion 142, thereby constantly limiting the insertion depths thereof.

At this time, the nut 150 is produced at the same length as the small diameter portion 141, and the inner diameter of the small diameter portion 141 preferably has the medium size between the outer diameters and the inner diameters of the shafts 161, 162. In this case, when the nut 150 is inserted into and mounted on the inner circumferential surface of the small diameter portion 141, both side ends of the nut 150 may be locked to the ends of the first shaft 161 and the second shaft 162, respectively, thereby preventing the axial behavior of the nut 150 more firmly.

As described above, the nut 150 is installed in a partial range of the center of the rotor sleeve 140 to reduce the contact area between the nut 150 and the lead screw 1, thereby reducing noise and vibration due to the friction between the nut 150 and the lead screw 1 when the motor is operated.

Figure 4:
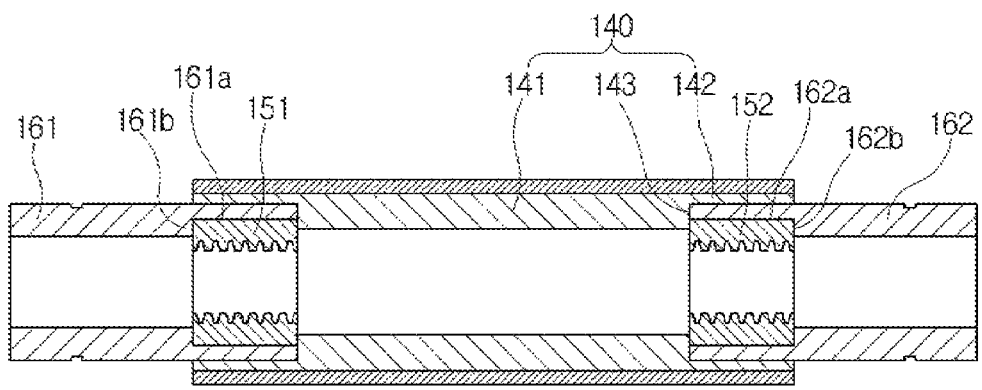
FIG. 4 is a diagram illustrating an exemplary embodiment in which the nut is installed on both end portions of the rotor.

FIG. 4 illustrates an exemplary embodiment different from that of FIG. 3, and is characterized in that a first nut 151 and a second nut 152 are installed on both side ends of the rotor sleeve 140, respectively.

As described above, the first nut 151 and the second nut 152 are coupled to the lead screw 1 on both side ends of the rotor sleeve 140, respectively to support the rotor (a state where all of the nut, the first and second shafts, and the magnet are assembled to the rotor sleeve) with respect to the lead screw 1 at two points. Therefore, if one nut 150 is installed on the center (the exemplary embodiment illustrated in FIG. 3), this is structurally more stable, such that it is more effective to suppress the movement of the rotor with respect to the lead screw 1.

Therefore, the sum of the lengths of the first nut 151 and the second nut 152 may be formed shorter than the length of the nut 150, and in this case, the contact area between the lead screw 1 and the nut is further reduced, thereby being advantageous for reducing noise and vibration.

Even in the exemplary embodiment illustrated in FIG. 4, the rotor sleeve 140 includes the small diameter portion 141 and the large diameter portion 142 on both sides thereof. However, a range (axial length) of the small diameter portion 141 is increased and thus the locking projection 143 is moved toward the end thereof, such that when the first nut 151 and the second nut 152 are inserted into the rotor sleeve 140 and thus the inner end is in contact with the locking projection 143, the outer end may be located on the same line on the end of the rotor sleeve 140. That is, the location of the locking projection 143 is appropriately changed such that the first nut 151 and the second nut 152 may accurately support both side ends of the rotor sleeve 140, thereby limiting the insertion depths of the first nut 151 and the second nut 152.

Meanwhile, the first nut 151 and the second nut 152 are inserted into and fixed to insertion grooves 161a, 162a formed on the ends of the first shaft 161 and the second shaft 162, respectively. When one side ends of the first nut 151 and the second nut 152 are in contact with locking projections 161b, 162b inside the insertion grooves 161a, 162a, the other side ends of the nuts 151, 152 do not protrude outward from the insertion grooves 161a, 162a and are located on the same line as the ends of the first shaft 161 and the second shaft 162.

Therefore, when the first shaft 161 and the second shaft 162 in the state where the first nut 151 and the second nut 152 are assembled are inserted into the large diameter portions 142 on both sides of the rotor sleeve 140, the ends of the shafts 161, 162 and the ends of the nuts 151, 152 are locked to the locking projection 143 of the rotor sleeve 140 together. To this end, the inner diameter of the small diameter portion 141 of the rotor sleeve 140 preferably has the medium size between the outer diameters and inner diameters of the first nut 151 and the second nut 152. Both side ends of the first nut 151 and the second nut 152 are locked to the locking projection 143 of the rotor sleeve 140 and the locking projections 161b, 162b of the shafts 161, 162 by such a structure, thereby reliably preventing the lateral movement.

Figure 5:
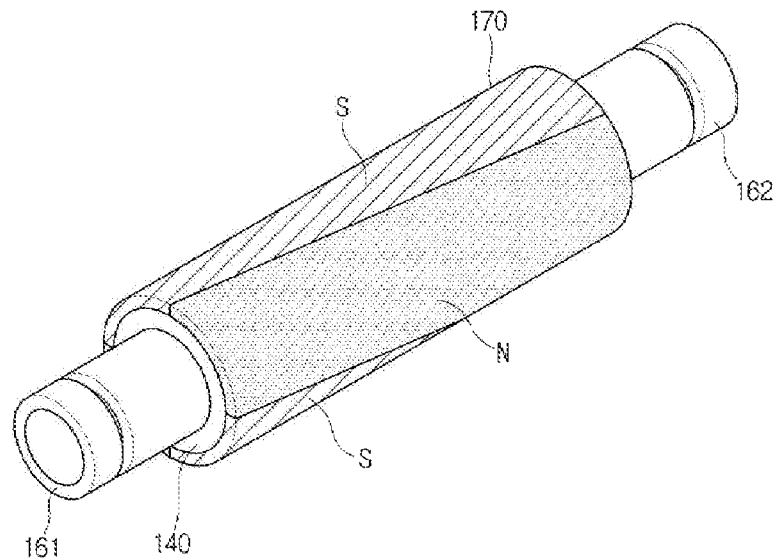
FIG. 5 is a perspective diagram illustrating the rotor.
Figure 6:
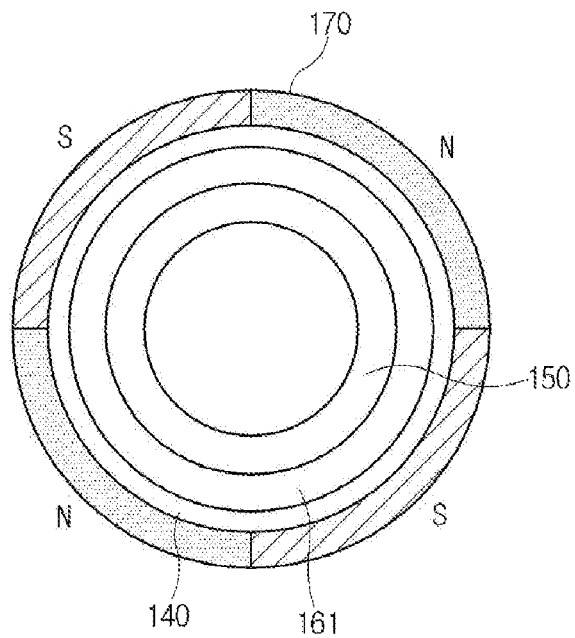
FIG. 6 is a side diagram illustrating the rotor.

As illustrated in FIGS. 5 and 6, the magnet 170 is mounted on the outer circumferential surface of the rotor sleeve 140. The magnet 170 is formed of one cylinder and is fixed in a state of surrounding the outer circumferential surface of the rotor sleeve 140.

The magnet 170 is magnetized by repeating an N pole and an S pole every same section in the circumferential direction. The magnet 170 is formed with four poles as two N poles and two S poles.

Since the magnet 170 does not use a division-type magnet (C-type magnet: as a magnet having an arc-shaped flat section, a magnetic pole of the rotor is generally formed by attaching a plurality of C-type magnets on the outer circumferential surface of the rotor sleeve), but is magnetized by continuously repeating the N pole and the S pole in the circumferential direction on the object to be magnetized having a cylindrical shape, a gap does not exist between the magnetic poles.

Therefore, when the motor 100 is operated, a cogging torque (is a pulsating torque generated by the motor having a permanent magnet rotor in a direction opposite to the rotating direction of the rotor, and a main cause of noise and vibration) due to the gap is not generated, thereby reducing noise and vibration of the motor 100.

Figure 7A:
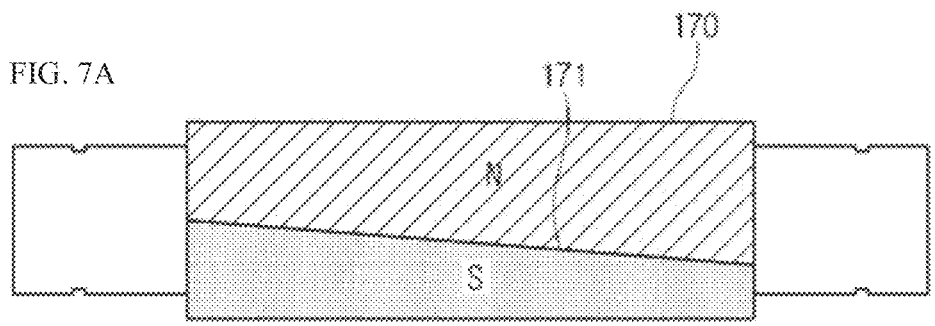
FIG. 7A is a plan diagram illustrating the rotor.
Figure 7B:
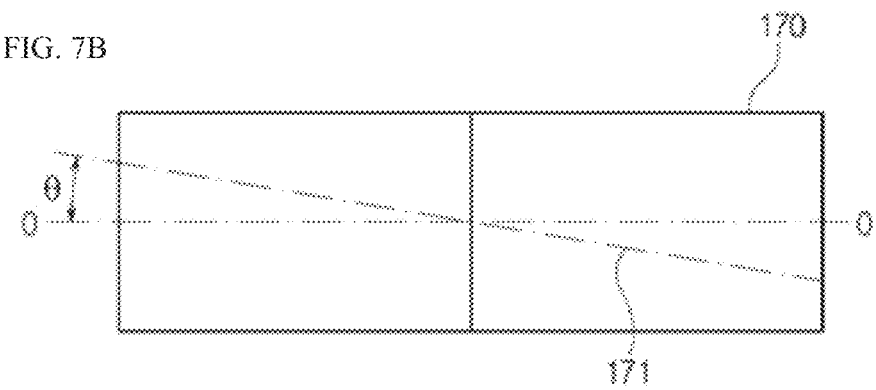
FIG. 7B is a schematic diagram for explaining a skew of a magnet attached to the rotor.

Meanwhile, as illustrated in FIG. 7, a skew is formed on the magnet 170. The skew is formed by tilting a boundary line 171 between the poles at a predetermined angle with respect to an axial straight line (0-0 line) (θ=skew angle).

As described above, when the skew angle is given, the conversion between the N pole and the S pole upon rotation of the rotor is not made at one timing point and consecutively and smoothly made at a predetermined time range, thereby reducing the cogging torque to reduce the noise and vibration of the motor.

Meanwhile, as the skew angle (θ) is increased, the cogging torque is reduced, and when the skew angle is 22.5°, the cogging torque becomes 0. However, as the skew angle is increased, the cogging torque is reduced but the output torque and efficiency of the motor 100 tend to be reduced together, such that it is not possible to largely form the skew angle unconditionally.

Therefore, the skew angle (θ) is preferably 5° to 15°. This is because when the skew angle is less than 5°, the cogging torque reduction amount is insignificant, thereby hardly feeling the noise and vibration reduction effect, and when the skew angle exceeds 15°, the output of the motor is rapidly reduced, thereby being inappropriate for being used for the motor of the power sliding device. That is, in the angle range, the motor 100 may prevent the excessive output and the efficiency reduction while having the noise and vibration reduction performance at the significant level.

Table 1 below compares the noise sizes of the conventional motor and the motor according to the present disclosure.

TABLE 1

| TEST condition | rpm | Conventional motor Max noise [dB] | Motor according to the present disclosure | |
|---|---|---|---|---|
| | | | Max noise [dB] | Change amount [dB] |
| Motor single product state | 500 | 34.7 | 30.9 | −3.8 |
| | 1000 | 40.9 | 31.9 | −9.0 |
| Rail assembled state | 1500 | 64.1 | 51.7 | −12.4 |

In the Table 1, it may be seen that the motor according to the present disclosure has the reduced noise in all of two cases, that is, the case of a single product state and the case of being assembled to the rail. Further, it may be confirmed that the noise reduction effect appears more prominently as the rotating speed of the motor is increased. Further, by confirming the noise reduction effect as described above, it is also possible to indirectly confirm the vibration reduction effect.

As described above, the present disclosure may inject-mold the nut with the plastic and install the nut only in the partial section of the inner diameter of the rotor sleeve, and remove the gap between the magnetic poles of the magnet and form the skew angle, thereby reducing the noise and vibration of the motor. Therefore, it is possible to reduce the noise and vibration of the power sliding device of the vehicle seat, and furthermore, to improve the interior quietness of the vehicle and the feeling of the use of the power sliding device.

As described above, while the present disclosure has been described with reference to the exemplary embodiments illustrated in the drawings, this is merely illustrative, and it will be understood to those skilled in the art that various changes and equivalent other exemplary embodiments therefrom are possible. Therefore, the true technical scope of the present disclosure should be defined by the appended claims.

What is claimed is:

1. A hollow-type BLDC motor of a power sliding device of a vehicle seat comprising:
   a case composed of a core case, a motor case installed on both ends of the core case, and a motor cover;
   a stator core installed inside the core case;
   a coil wound around the stator core;
   a rotor sleeve located on the center inside the case;
   a nut fixed to the inside of the rotor sleeve;
   a first shaft and a second shaft fixed to both ends of the rotor sleeve, respectively; and
   one magnet mounted in a structure surrounding the outer circumferential surface of the rotor sleeve
   wherein the nut is screwed with a lead screw passing through the rotor sleeve, the nut being installed in a partial range of an inside center of the rotor sleeve to reduce a contact area between the nut and the lead screw.

2. The hollow-type BLDC motor of the power sliding device of the vehicle seat of claim 1, wherein the nut is injection-molded with a plastic material.

3. The hollow-type BLDC motor of the power sliding device of the vehicle seat of claim 1, wherein one nut is installed on the longitudinal intermediate portion of the rotor sleeve.

4. The hollow-type BLDC motor of the power sliding device of the vehicle seat of claim 3, wherein a small diameter portion is formed on the center of the inner diameter portion of the rotor sleeve, a large diameter portion is formed on both sides of the small diameter portion, the nut is inserted into and installed on the small diameter portion, the first shaft and the second shaft are inserted into the large diameter portion on both sides of the small diameter portion and locked to a locking projection between the small diameter portion and the large diameter portion, the nut is formed at the same length as the small diameter portion, and the inner diameter of the small diameter portion has the medium size between the outer diameters and inner diameters of the first shaft and the second shaft.

5. The hollow-type BLDC motor of the power sliding device of the vehicle seat of claim 1, wherein the nut is installed on each of both ends of the rotor sleeve.

6. The hollow-type BLDC motor of the power sliding device of the vehicle seat of claim 5, wherein a small diameter portion is formed on the center of the inner diameter portion of the rotor sleeve, a large diameter portion is formed on both sides of the small diameter portion, the first shaft and the second shaft are inserted into the larger diameter portion on both sides of the small diameter portion and locked to a locking projection between the small diameter portion and the large diameter portion, insertion grooves are formed in the ends of the first shaft and the second shaft inserted into the large diameter portion, a first nut and a second nut are inserted into the insertion grooves, both side ends of the first nut and the second nut are in close contact and supported between the locking projection of the rotor sleeve and locking projections inside the insertion grooves of the first shaft and the second shaft, and the inner diameter of the small diameter portion has the medium size between the outer diameters and inner diameters of the first nut and the second nut.

7. The hollow-type BLDC motor of the power sliding device of the vehicle seat of claim 1, wherein the magnet is magnetized by repeating an N pole and an S pole in the same range in a circumferential direction on the object to be magnetized having a cylindrical shape.

8. The hollow-type BLDC motor of the power sliding device of the vehicle seat of claim 7, wherein a gap does not exist between the magnetic poles of the magnet.

9. The hollow-type BLDC motor of the power sliding device of the vehicle seat of claim 8, wherein the magnet has a skew angle formed on a boundary line between the magnetic poles, and the skew angle is in a range of 5° or more to 15° or less.

10. The hollow-type BLDC motor of the power sliding device of the vehicle seat of claim 1, wherein bearings for supporting the first shaft and the second shaft are inserted into and seated on the inner portions of the motor case and the motor cover.

* * * * *